Dec. 12, 1950  E. C. HARTWIG  2,533,318
TIMER
Filed March 24, 1948

WITNESSES:
E. A. McCloskey
Nw. C. Groome

INVENTOR
Edward C. Hartwig.
BY
Lyman Diamond.
ATTORNEY

Patented Dec. 12, 1950

2,533,318

UNITED STATES PATENT OFFICE 2,533,318

TIMER

Edward C. Hartwig, Tonawanda, N. Y., assignor to Westinghouse Electric Corporation, East Pittsburgh, Pa., a corporation of Pennsylvania Application March 24, 1948, Serial No. 16,860

22 Claims. (Cl. 315—246)

My invention relates to electric discharge apparatus, and has particular relation to welding timers.

Each resistance welding operation is made up of a sequence of events which are initiated by the closing of the start switch for the welder. First, during the "Squeeze" interval, the welding electrodes engage the work and are held in engagement for a predetermined time interval in the absence of welding current. Next, during the "Weld" interval welding current flows during a predetermined time interval. Thereafter, the electrodes are held in engagement with the work during a predetermined time interval, the "Hold" interval and then disengaged. After the electrodes are disengaged from the work, they are held open for a predetermined time interval to permit resetting of the welder for a new operation. The time interval from the start of the disengagement until the start of a new weld is called the "Off" interval.

The "Squeeze," "Weld," "Hold," and "Off," intervals are measured by the operation of electronic timers included in a welding system. Such timers include reactances, customarily capacitors, the time of charge or discharge of which measure out the necessary time intervals.

On the whole, welding systems constructed and operated in accordance with the teachings of the prior art, and including such timers, have proved satisfactory. On certain occasions however, particularly where the various sequential intervals are relatively short or when the material to be welded is relatively thin, I have found that the welds produced with such prior art systems are not uniformly satisfactory. In certain regions, the metal is not properly fused and the parts joined may be pulled apart by application of a relatively small tensional force. In other regions, the metal is oxidized.

It is, accordingly, an object of my invention to provide a welding system which shall operate to produce uniformly satisfactory welds.

Another object of my invention is to provide a welding system including an electronic timer which shall operate to produce uniformly welds of properly fused unoxidized metal.

An ancillary object of my invention is to provide a novel regulating network of the alternating current type.

Another ancillary object of my invention is to provide a novel electronic timer.

My invention arises from the realization that the imperfections in the welds produced with prior art timers are caused by discrepancies in the timing. Such discrepancies arise from variations in the potentials impressed on the timing and their associated components. The power for the timers is ordinarily derived from a commercial supply, the potential variation of such a supply is of the order of a few volts. The inaccuracy in timing which may be introduced by such potential variations is of the order of a fraction of a half-period of the supply. However, the "Squeeze," "Weld," "Hold," and "Off" intervals are ordinarily only a few half-periods in duration. Relative to an interval of a few half-periods, a discrepancy of a fraction of a half-period may loom rather large. My invention is based on the concept that such discrepancies, small in absolute magnitude but large in relative magnitude, may mar the uniformity of a welding operation.

I have further realized that the timing is determined primarily by the maximum magnitudes to which the potential impressed on a current transmitted through the timing parameters rises. This proposition is particularly applicable to timing systems in which the parameter is a capacitor. The potential to which a capacitor may be charged is substantially equal to the maximum magnitude of the impressed potential. In situations where the potential is derived from an alternating current source the capacitor potential is equal to the amplitude of the alternating current.

In accordance with my invention, discrepancies in the timing are suppressed by maintaining constant the potential (or in the case of inductive reactors, the current) impressed on the timing parameters. To accomplish this object I have provided a welding system including a timer, the parameters of which are supplied with constant amplitude potentials of flat top wave form.

The novel features that I consider characteristic of my invention are set forth with particularity in the appended claims. My invention itself, however, both as to its organization and its method of operation together with further objects and advantages thereof, will be understood by reference to the following description and to the drawing in which:

Figures 1, 2:
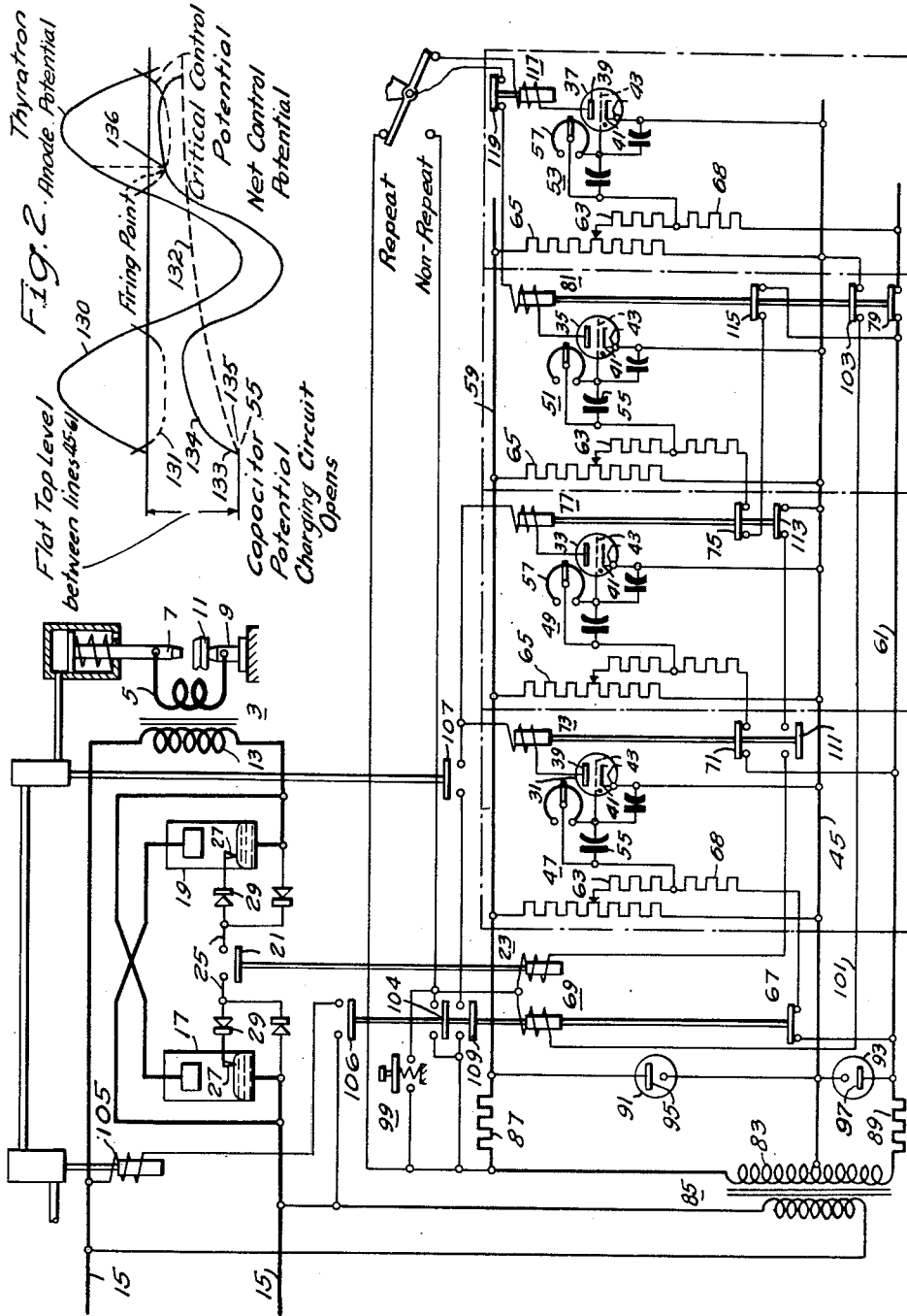
Figure 1 is a diagrammatic view showing an embodiment of my invention.
Fig. 2 is a graph illustrating the operation of the apparatus shown in Fig. 1.

The apparatus shown in Fig. 1 comprises a welding transformer 3 across the secondary 5 of which welding electrodes 7 and 9 are connected. One of the electrodes 7 is hydraulically movable in and out of engagement with the work 11. The primary 13 of the welding transformer is supplied from alternating current power supply busses 15, preferably of the commercial type, through a pair of ignitrons 17 and 19 connected in anti-parallel to conduct alternating current. The nominal magnitude of the commercial voltage selected may be as low as 200 (minimum for ignitrons) volts or as high as 2300 volts.

The conductivity of the ignitrons 17 and 19 is controlled by a normally open movable contact 21 of a control relay 23. When this relay is energized, the contact closes a circuit through conductors 25 interconnecting the igniters 27 of the ignitrons through rectifiers 29, preferably of the dry type. Depending on the polarity of the supply, firing current is conducted through the igniter 27 of one or the other of the ignitrons 17 or 19, and that ignitron is rendered conductive. During the succeeding half-period of the supply, firing current is conducted through the igniter of the other ignitron, and the latter is rendered conductive. The ignitrons continue to conduct alternating current so long as the movable contact 21 of the control relay 23 remains closed.

The actuation of the control relay 23 is dependent on the operation of a timing system. The latter includes a plurality of thyratrons 31, 33, 35 and 37, each having an anode 39, a cathode 41, and a control electrode 43 (in addition to any other electrodes which the thyratrons available in the art may have). Each thyratron is connected in an electronic timing circuit designed to perform one of the sequential timing operations "Squeeze," "Weld," "Hold," or "Off," of the welder. The cathodes 41 of the thyratrons are connected to a line conductor 45 common to all timers. Each timing circuit includes a timing network 47, 49, 51, 53 respectively including a capacitor 55 having a variable resistor 57 connected in parallel therewith. One terminal of each network 47 to 53 is connected to the control electrode 43 of the associated thyratron. The other terminal of the network is connected through separate channels to two line conductors 59 and 61; to the first line conductor 59 through a resistor 63 and an adjustable tap of a potentiometer or voltage divider 65 which is connected across the circuits 45 and 59, and to the second line conductor 61 through another resistor 68 and the normally closed contact of an associated relay. The "Squeeze" network 47 is connected to the line conductor 61 through the contact 67 of the start relay 69, the "Weld" network 49 through the contact 71 of the "Squeeze" relay 73, the "Hold" network 51 through the contact 75 of the "Weld" relay 77, and the "Off" network 53 through the contact 79 of the "Hold" relay 81.

The cathode line conductor 45 is connected to the center tap of the secondary 83 of a transformer 85. The other line conductors 59 and 61 are connected through resistors 87 and 89 to the terminals of the secondary 83, so that the upper and lower halves of the secondary 83 constitute sources of alternating-current voltages 180° out of phase with each other, these two voltages being measured from the common intermediate conductor 45. Between the center conductor 45 and each of the terminal conductors 59 and 61, an asymmetrically conductive voltage regulator tube 91 and 93 respectively is connected. The cathodes 95 of the regulator tubes are connected together to the center conductor 45 and the anode 97 of each regulator tube is connected to a separate terminal line conductor. The regulator tubes are thus connected so as to conduct positive current in a direction from the control electrodes 43 to the cathodes 41 of the thyratrons 31, 33, 35, and 37. Each of the voltage regulator tubes 91 and 93 is selected to conduct at a potential lower than the peak positive value of the alternating-current potential impressed between its associated line conductors 59—45 and 61—45, as the case may be. Preferably, each voltage regulator tube should start to conduct at an instant approximately 30° after the zero instant in the positive half-period, or the half-period of the supply during which it is conductive. The regulator tubes 91 and 93 operate to "clip" the positive peaks of the alternating-current supply voltages, so as to maintain the potentials existing across the line conductors 59—45 and 61—45 of uniform amplitude and flat top positive wave form, regardless of variations in the line voltage of the supply busses 15.

When the lower line conductor 61 is positive relative to the central or cathode line conductor 45, the control electrodes 43 of the thyratrons 31, 33, 35, 37 are positive relative to their respective cathodes 41, so that said control electrodes 43 act as the anodes of rectifiers, and current flows through the associated normally closed contacts 67, 71, 75, 79 to charge each of the capacitors 55 in the associated networks 47, 49, 51, 53 with its right hand plate negative and its left hand plate positive. A bias potential is thus impressed in the control circuit of each thyratron which is equal to the amplitude of the potential of the flat top positive wave of the lower line conductor 61, this potential being held constant by the voltage regulator tube 93, regardless of variations in the line voltage of the supply busses 15. During the next half cycle of the supply circuit 15, a constant flat top positive potential is applied, by the upper line conductor 59, to the anode 39 of each of the thyratrons 31, 33, 35 and 37, and during this period the potential which is impressed between the control electrodes 43 and the cathodes 41 of the thyratrons is composite and is made up of the flat top positive potential impressed through the voltage dividers 65 from the upper line conductor 59 and the bias potential of the associated timing networks. The thyratrons, under such circumstances, are at first biased to non-conductivity; the flat top positive potential superimposed on the bias is insufficient to render the thyratrons conductive.

To initiate a welding operation, the work 11 is disposed on the lower electrode 9 and a start switch 99 is closed. Current flows from the upper terminal of the secondary 83 through the start switch 99, the exciting coil of the start relay 69, a conductor 101, normally closed contact 103 of the "Hold" relay 81, to the center line conductor 45. The start relay is actuated, and is locked in through one of its normally open (but now closed) contacts 104. The upper normally open contacts 106 of the relay also close a circuit through the exciting coil of the solenoid 105 which controls the fluid supply for the movable electrode 7. The movable electrode engages the work; when it has properly engaged the work, a back-pressure contact 107 is closed When the start relay 69 is actuated, its normally closed contact 67 is also opened, opening the charging circuit for the "Squeeze" timing capacitor 55. The capacitor, therefore, begins to discharge, at an exponential rate, through its associated variable resistor 57. After the capacitor potential has decreased to a predetermined magnitude, the composite control potential on the "Squeeze" thyratron 31 becomes sufficiently positive, with respect to the cathode circuit 45, to render this thyratron conductive. Under such circumstances, current flows from the upper terminal of the secondary 83 through another now closed contact 109 of the start relay 69, the back-pressure contact 107, the exciting coil of the "Squeeze" relay 73, the thyratron 31 to the center line conductor 45. The "Squeeze" interval, that is the time interval between the closing of the start switch 99 and the actuation of the "Squeeze" relay, is determined by the setting of the variable resistor 57, in the "Squeeze" network 47.

When the "Squeeze" relay 73 is actuated, its normally closed contact 71 opens. The "Weld" interval capacitor 55, which is then fully charged, now begins to discharge through its associated resistor 57. The actuation of the "Squeeze" relay also results in the closing of normally open contacts 111. Current also flows in a circuit from the upper terminal of the secondary 83 through now closed contact 104 of the start relay 69, the exciting coil of the control relay 23, the now closed contact 111 of the "Squeeze" relay, and the normally closed contact 113 of the "Weld" relay to the center line conductor 45.

The control relay 23 is now actuated closing the firing circuits for the ignitrons 17 and 19, and welding current is supplied through the work 11. The time interval during which welding current flows is determined by the "Weld" network 49. When the capacitor 55 in this network has discharged sufficiently, the "Weld" relay 77 is actuated. The lower contactor 113 of this relay is now opened, opening the circuit through the exciting coil of the control relay 23. The firing circuits of the ignitrons 17 and 19 are then opened, and the last ignitron to conduct becomes non-conductive at an instant following the zero instant of the potential supplied to it by a magnitude predetermined by a reactance of the welding transformer.

The actuation of the "Weld" relay 77 also results in the opening of its normally closed contact 75 and the discontinuance of the supply of potential to the timing capacitor 55 in the "Hold" network 51. After a predetermined time interval, as determined by the setting of the resistor 57 of the "Hold" network, the "Hold" relay 81 is actuated. The normally closed contact 103 of the relay opens, opening the circuit through the start relay 69. The start relay now drops out, and the fluid pressure solenoid 105 is deenergized at 106, the anode circuit through the "Squeeze" and "Weld" thyratrons 31 and 33 respectively opened at the back-pressure contact 107 and the connection 67 between the conductor 61 and the "Squeeze" timing capacitor 55 in network 47 closed. When the "Squeeze" thyratron 31 is deenergized, the "Squeeze" relay 73 drops out, opening the circuit of the exciting coil of the control relay 23 at contact 111 and reclosing the charging circuit for the "Weld" timing capacitor 55 at contact 71. The dropping out of the "Weld" relay 77 does not reclose the charging circuit for the "Hold" capacitor 55. This circuit is maintained open by now open contact 115 of the "Hold" relay 81.

At the now open contact 79 of the "Hold" relay 81, the charging circuit for the timing capacitor 55 of the "Off" network 53 is opened. This capacitor discharges and after a predetermined time interval, the "Off" thyratron 37 is energized and the "Off" relay 117 actuated. The normally closed contact 119 of this relay is now opened, opening the circuit through the "Hold" thyratron 35 deenergizing the "Hold" relay 81 and resetting the system for another operation. When the "Hold" relay 81 is deenergized, its normally closed contact 79 recloses the charging circuit for the "Off" timing capacitor 55 of the timing network 53 and the latter is charged. The "Off" thyratron 37 becomes non-conductive as soon as its anode 39 is receiving an insufficient positive voltage after its grid capacitor is charged.

The timing system described above operates to provide accurate timing of the sequence of operations of the welding system. The timing capacitors 55 are charged to a potential equal to the amplitude of the flat top wave form potential between the center line conductor 45 and the lower conductor 61. The amplitude of this potential is constant as determined by the regulator tube 93. The firing of the thyratrons 31, 33, 35, and 37 is determined by the four composite potentials made up of positive flat top wave form potentials of constant amplitude and the diminishing negative potentials of the discharging capacitors 55. These constant amplitude potentials are derived at the taps of the respective potentiometers 65 between lines 45 and 59 and both these taps and the discharge resistors 57 of the various timing networks 47, 49, 51 and 53 can be set to yield the timing desired for each event. For each thyratron these composite potentials are uniform throughout an operation and render the respective thyratrons conductive uniformly at the same instants following the zero instants of the half-periods of the supply. The anode potentials impressed on the thyratrons 31 to 37 vary with the variation in the supply, but these variations have a negligible effect on critical grid voltages of the thyratrons, and hence on the timing.

The operation of the system is illustrated in Fig. 2 in which voltage is plotted vertically and time horizontal. The full line heavy curve represents the anode voltage impressed on the thyratrons 31, 33, 35, and 37. The dash-dot curve 131 under each positive half wave of the anode voltage curve represents the critical grid voltage which is to be exceeded if the thyratrons are to be rendered conductive. The lower dash curve 132 represents the potential on the capacitor 55 in one of the networks 47, 49, 51 and 53. The full line curve 133 intersecting the dash curve 132 represents the net voltage impressed between the control electrode 43 and the cathode 41 of any thyratron. This curve 133 is of uniform flat top wave form as shown at 134 up to the point at which the dash curve 132 rises following the instant 135 when the capacitor begins to discharge. Following this instant 135 the control electrode curve 133 rises rapidly until the point 136 when it intersects a critical curve 131. At this point 136, the associated thyratron is rendered conductive.

In accordance with the broader aspects of my invention the various components disclosed in Fig. 1 may be replaced by others without departing from the scope of my invention. Typical replacements are the following: The electronic contactor 17—19 may be replaced by one including firing thyratrons, or under the proper circumstances, by a mechanical contact. The timer circuits may include other components than the thyratrons 31 to 37 for example high vacuum tubes or properly connected rectifiers. The capacitor networks 47 to 53 may be replaced by inductive networks.

Although I have shown and described a certain specific embodiment of my invention, I am fully aware that many modifications are practicable. My invention, therefore, is not to be restricted except insofar as is necessitated by the prior art and by the spirit of the appended claims.

I claim as my invention:

1. For use with an alternating current supply the combination comprising a pair of conductors between which a predetermined alternating potential is to be impressed, a third conductor between which and each of said pair of conductors an alternating potential is to be impressed, a first asymmetrically conductive voltage regulator connected between said third conductor and one of said pairs of conductors to conduct current of one polarity, and a second asymmetrically conductive voltage regulator connected between said third conductor, and the other of said pair of conductors to conduct current of the opposite polarity.

2. In combination, a winding having a plurality of taps, a first asymmetrically conductive voltage regulator connected to conduct current of one polarity between a pair of said taps and a second asymmetrically conductive voltage regulator connected to conduct current of the opposite polarity between another pair of said taps.

3. In combination a winding having terminal taps and an intermediate tap, a first asymmetrically conductive voltage regulator connected to conduct current of one polarity between one of said terminals and said intermediate tap and a second asymmetrically conductive voltage regulator connected to conduct current of the opposite polarity between another of said terminals and said intermediate tap.

4. In combination a winding having terminals and an intermediate tap, said winding being designed to deliver a first predetermined difference of potential between a first terminal and said intermediate tap and a second predetermined difference of potential between a second terminal and said intermediate tap when said winding is connected to a commercial alternating current supply, a first asymmetrically inductive voltage regulator connected to conduct current of one polarity between said first terminal and said intermediate tap and a second asymmetrically conductive voltage regulator connected to conduct current of the opposite polarity between said second terminal and said intermediate tap, said first and second regulators being of the type which become conductive when potentials smaller than said first and second potentials respectively are impressed between their respective terminals.

5. In combination, a winding having terminals and an intermediate tap, said winding being designed to deliver a first predetermined alternating current difference of potential between a first terminal and said intermediate tap and a second alternating current predetermined difference of potential between a second terminal and said intermediate tap when said winding is connected to a commercial alternating current supply, a first asymmetrically conductive voltage regulator connected to conduct current of one polarity between said first terminal and said intermediate tap and a second asymmetrically conductive voltage regulator connected to conduct current of the opposite polarity between said second terminal and said intermediate tap, said first and second regulators being of the type which become conductive for voltages occurring at instants displaced by approximately 30° from the zero instants in the periods of said first and second alternating potentials respectively.

6. In combination a reactance, a charging circuit for said reactance including a pair of conductors across which a potential of flat top wave form may be derived when said circuit is connected to a supply and a discharging network for said reactance.

7. In combination a reactance, a charging circuit for said reactance including a pair of conductors across which a potential of flat top wave form may be derived when said circuit is connected to a supply, a discharging network for said reactance, and a second circuit connected to said network, a second potential of flat top wave form being derived from said second circuit when it is connected to a supply.

8. In combination a reactance, a charging circuit for said reactance including a pair of conductors across which a potential of flat top wave form may be derived when said circuit is connected to a supply, a discharging network for said reactance, and a second circuit connected to said network, a second potential of flat top wave form being derived from said second circuit when it is connected to a supply, and of polarity opposite to the polarity of said first named potential.

9. In combination an electric discharge device having a control electrode, an anode and a cathode; a circuit including in series a winding, a capacitor-resistor network, said control electrode and cathode; and an asymmetrically conductive voltage regulator connected across said winding to conduct current in a direction from said control electrode to said cathode.

10. In combination an electric discharge device having a control electrode, an anode and a cathode; a circuit including in series a winding, a capacitor-resistor network, said control electrode and cathode; an asymmetrically conductive voltage regulator connected across said winding to conduct current in a direction from said control electrode to said cathode, and provisions for opening said circuit.

11. In combination an electric discharge device having a control electrode, an anode and a cathode; a circuit including in series a winding, a capacitor-resistor network and said control electrode and cathode; an asymmetrically conductive voltage regulator connected across said winding to conduct current in a direction from said control electrode to said cathode; a second circuit including in effect in series a second winding, said capacitor-resistor network, said control and said cathode; and a second asymmetrically conductive voltage regulator connected across said second winding to conduct current in a direction from said control electrode to said cathode.

12. In combination an electric discharge device having a control electrode, an anode and a cathode, a circuit including in series a winding, a capacitor-resistor network, said control electrode and cathode, an asymmetrically conductive voltage regulator connected across said winding to conduct current in a direction from said control electrode to said cathode; provisions for opening said circuit, a second circuit including in effect in series a second winding, said capacitor-resistor network, said control and said cathode; and a second asymmetrically conductive voltage regulator connected across said second winding to conduct current in a direction from said control electrode to said cathode.

13. In combination a plurality of electric discharge devices each having a control electrode, and an anode and a cathode, said cathodes being connected to a common conductor, a plurality of capacitor-resistor networks each connected to a control electrode of one of said discharge devices at one terminal and to another common conductor at another terminal and an asymmetrically conductive voltage regulator connected between said conductors in a sense such as to conduct current from said control electrodes to said cathodes.

14. In combination a plurality of electric discharge devices each having a control electrode, an anode and a cathode, said cathodes being connected to a common conductor, a plurality of capacitor-resistor networks having a plurality of terminals each network connected to a control electrode of one of said discharge devices at one terminal, through a switch and directly to another common conductor at a second terminal and a third common conductor respectively at a third terminal, an asymmetrically conductive voltage regulator connected between said first named conductor and said other conductor in a sense such as to conduct current from said control electrodes to said cathodes, and another asymmetrically conductive voltage regulator connected between said first named conductor and said third conductor in a sense such as to conduct current from said control electrode to said cathode.

15. For use with an alternating current supply the combination comprising a pair of conductors between which a predetermined alternating potential is to be impressed, a third conductor between which and each of said pair of conductors an alternating potential is to be impressed, a first asymmetrically conductive gaseous electric discharge device connected between said third conductor and one of said pair of conductors to conduct current of one polarity, and a second asymmetrically conductive gaseous electric discharge device connected between said third conductor, and the other of said pair of conductors to conduct current of the opposite polarity.

16. In combination an electric discharge device having a control electrode, an anode and a cathode; a circuit including in effect in series a winding, an impedance resistor network, said control electrode and cathode; and voltage regulator connected across said winding to conduct current in a direction from said control electrode to said cathode.

17. In combination an electric discharge device having a control electrode, an anode and a cathode; a circuit including in series a winding, a capacitor-resistor network and said control electrode and cathode; a voltage regulator connected across said winding to conduct current in a direction from said control electrode to said cathode; a second circuit including in effect in series a second winding, said capacitor-resistor network, said control and said cathode; and an asymmetrically conductive voltage regulator connected across said second winding to conduct current in a direction from said control electrode to said cathode.

18. In combination an electric discharge device having a control electrode, an anode and a cathode, a circuit including in series a winding, a capacitor-resistor network, said control electrode and cathode, a voltage regulator connected across said winding to conduct current in a direction from said control electrode to said cathode; provisions for opening said circuit, a second circuit including in effect in series a second winding, said capacitor-resistor network, said control and said cathode; and an asymmetrically conductive voltage regulator connected across said second winding to conduct current in a direction from said control electrode to said cathode.

19. In combination a plurality of electric discharge devices each having a control electrode, and an anode and a cathode, said cathodes being connected to a common conductor, a plurality of capacitor-resistor networks each connected to a control electrode of one of said discharge devices at one terminal and to another common conductor at another terminal and a voltage regulator connected between said conductors to conduct current from said control electrodes to said cathodes.

20. A timing apparatus comprising: two sources of alternating-current voltages approximately 180° out of phase with each other, said voltages being considered with reference to a common intermediate conductor; means, including a voltage regulator tube, for clipping off the peaks of the positive half-waves of a first one of said sources and providing an alternating-current control circuit having fairly constant, limited magnitude, maximum positive voltages, said maximum positive voltages being relatively unaffected by variations in the magnitudes of the source voltage; a controlled tube having an anode, a cathode and a control electrode; a controlled device in series circuit relation in the anode-cathode circuit of said tube; a dischargeable reactor network in series circuit relation in the control electrode circuit of said tube, said dischargeable reactor network including an energy-storing means, for holding an impressed voltage, and a shunt-connected discharging resistance; means for energizing the anode-cathode circuit of the tube from the other voltage source, with the cathode of the tube connected to said common intermediate conductor of the sources; means for charging said dischargeable reactor network from the aforesaid control circuit; circuit means for disconnecting said dischargeable reactor network from its control circuit; and auxiliary circuit means, including a resistor, for connecting said discharging reactor network to the cathode of the tube.

21. A timing apparatus comprising: two sources of alternating-current voltages approximately 180° out of phase with each other, said voltages being considered with reference to a common intermediate conductor; means, including voltage regulator tubes and resistances in series with said voltage regulator tubes, for clipping off the peaks of the positive half-waves of the respective sources and providing two alternating-current control circuits having fairly constant, limited magnitude, maximum positive voltages approximately 180° out of phase with each other, said maximum positive voltages being relatively unaffected by variations in the magnitudes of the source voltages; a controlled tube having an anode, a cathode and a control electrode; a controlled device in series circuit relation in the anode-cathode circuit of said tube; a dischargeable reactor network in series circuit relation in the control electrode circuit of said tube, said dischargeable reactor network including an energy-storing means, for holding an impressed voltage, and a shunt-connected discharging resistance; means for energizing the anode-cathode circuit of the tube from a first one of said voltage sources, with the cathode of the tube connected to said common intermediate conductor of the sources; means for charging said dischargeable reactor network from the control circuit which is connected to the other voltage source; circuit means for disconnecting said dischargeable reactor network from its control circuit; auxiliary circuit means for deriving a control electrode voltage from the other control circuit; and auxiliary circuit means, including a resistor, for connecting said discharging reactor network to said auxiliary circuit means.

22. In combination a transformer having terminal taps and at least one intermediate tap; an electric discharge device having a control electrode, an anode and a cathode; connections between the anode and one of said terminal taps; connection between said cathode and said intermediate tap; a timing network; and a circuit including in series said other terminal tap, said network and said cathode in series.

EDWARD C. HARTWIG.

REFERENCES CITED

The following references are of record in the file of this patent:

UNITED STATES PATENTS

| Number | Name | Date |
|---|---|---|
| 1,686,974 | Kroger | Oct. 9, 1928 |
| 1,960,047 | Bedford | May 22, 1934 |
| 2,130,440 | Willis | Sept. 20, 1938 |
| 2,248,929 | Adler | July 15, 1941 |
| 2,443,100 | Edwards | June 8, 1948 |